E. E. WHITMORE.

DIAPHRAGM BUFFING MECHANISM.

APPLICATION FILED DEC. 12, 1918.

Reissued Aug. 12, 1919.

14,706.

Witnesses:
A. J. Sauser,
R. Burkhardt

Inventor:
Edward E. Whitmore,
By Cromwell, Greist & Warden
Attys.

UNITED STATES PATENT OFFICE.

EDWARD E. WHITMORE, OF CHICAGO, ILLINOIS, ASSIGNOR TO THE CURTAIN SUPPLY COMPANY, OF CHICAGO, ILLINOIS, A CORPORATION OF ILLINOIS.

DIAPHRAGM BUFFING MECHANISM.

14,706. Specification of Reissued Letters Patent. Reissued Aug. 12, 1919.

Original No. 1,231,680, dated July 3, 1917, Serial No. 105,111, filed June 22, 1916. Application for reissue filed December 12, 1918. Serial No. 266,500.

*To all whom it may concern:*

Be it known that I, EDWARD E. WHITMORE, a citizen of the United States, residing at Chicago, in the county of Cook and State of Illinois, have invented certain new and useful Improvements in Diaphragm Buffing Mechanism, of which the following is a specification.

In car vestibule diaphragm construction it is of great importance to embody therein buffing mechanism which will combine in a high degree flexibility, resiliency, efficiency in taking care of the shocks and distortions incident to use of cars in yards and on curves as well as straight stretches of track, and, with all, such simplicity of construction and operation as will conduce to a low cost of installation and upkeep.

According to my present invention, these objects are accomplished by substituting for the usual reciprocatory rod buffing mechanism above the vestibule a rocking leaf spring mechanism connected up with the car end and face plate in such manner as to most efficiently absorb shock and compensate for lateral distortion.

In order that the invention may be readily understood a preferred embodiment of the same is set forth in the accompanying drawing, and in the description based thereon. Obviously, however, the invention is susceptible of embodiment in other and varied constructional forms without departure from the essence thereof, wherefore the drawing and description are to be taken in an illustrative rather than in an unnecessarily limiting sense. In the drawing—

As herein illustrated, the underframing of the car is indicated at 11, the upper framing at 12, the car end at 13, and the end post at 14. Suitably attached to the end plate between the end post is a stationary member 15 arranged to be telescoped with the movable member 16 of a metallic diaphragm such as shown in patent to Brown, No. 1,167,973, which has been chosen for purposes of illustration although, obviously, the construction of the invention is susceptible of use with diaphragm constructions of any approved form whether accordion plaited fabric or of metal. In case of a fabric diaphragm the car end would correspond to the stationary member of a metal diaphragm. The face plate is indicated at 17 secured to and forming the face of the diaphragm member 16 and provided below with a usual buffing stem 18 provided with compression springs 19, the same being suitably mounted within the underframing of the car.

Figure 1:
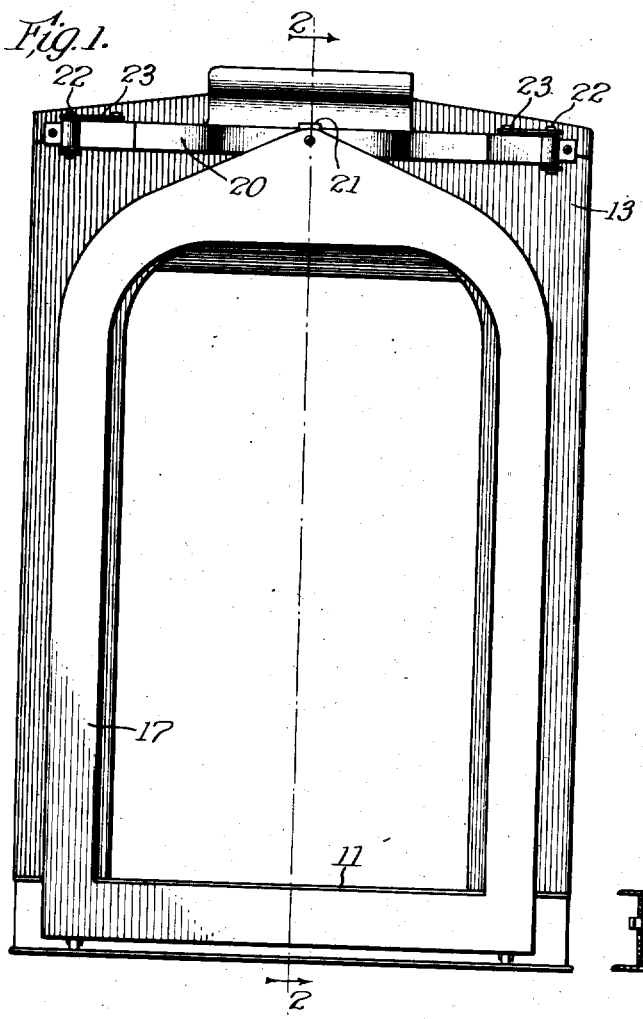
Figure 1 is a front elevation showing the face plate of the diaphragm and upper buffing mechanism.
Figure 2:
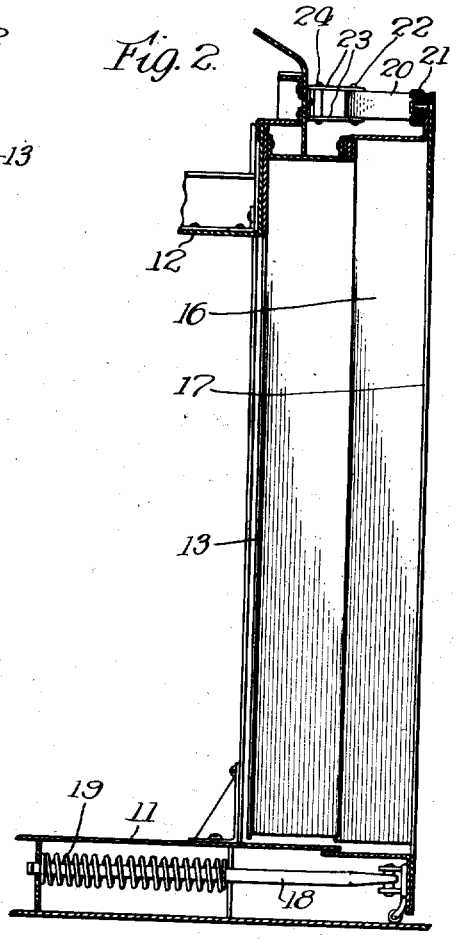
Fig. 2 is a vertical section on the line 2—2 of Fig. 1.
Figure 3:
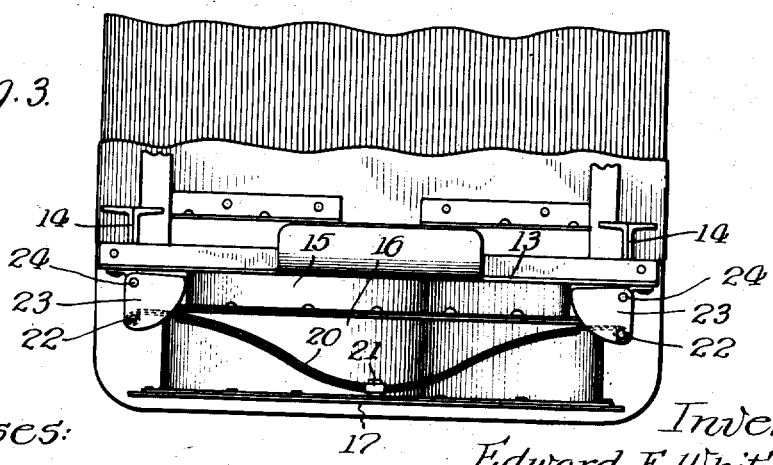
Fig. 3 is a top plan view.

Above, the buffing and other strains of operation are taken care of by means of a bow leaf spring 20 medially secured to the face plate at 21, and at its outer ends pivoted at 22 to a segmental or angular hinge plate or link 23 pivoted to the car end at 24. The plates 23 are preferably arranged in pairs one above the other spaced apart a distance corresponding substantially to the width of the bow spring 20 as clearly shown in Fig. 2. It will be noted that the angular plates 23 are pivoted at 24 so as to swing upon said pivot from a position with the rear edge of the plate bearing against the car end as an abutment to a position with said rear edge inclined thereto. This for the purpose of lending extreme flexibility in operation to the bow spring 20, permitting, as it does, the ends of said spring to separate laterally of the car as the central portion thereof moves to the rear longitudinally of the car under the impact of buffing blows.

Heretofore where the leaf spring type of upper buffing has been employed, it has been customary to provide a sliding engagement between the ends of the spring and the plate against which they bear and ordinarily to limit the movement of such spring ends in but one direction, as for instance limiting the inward play but permitting the ends to move outwardly without offering any restriction to the flattening of the spring under buffing strains. Where the buffing strains are direct, this usual construction permits of the absorption thereof by the two halves of the spring equally, but where such strains are applied obliquely as on curves, one end of the spring moves outwardly without restraint whereas the other is prevented from moving inwardly and as a consequence the strains are applied unequally and, in extreme cases, to one-half of the spring only. There is thus no substantial compensation for lateral distortion. Moreover, the sliding connection is subject to wear and is noisy in an objectionable degree.

It will be observed that with the upper buffing mechanism described, not only is the face plate permitted to move to the rear in a right line, telescoping the diaphragm section, under direct buffing strains, but it is also permitted to freely rock on sharp curves about its vertical axis corresponding with the point of attachment of the spring 21 without any binding of the parts and with a distribution of obliquely applied buffing strains throughout the two halves of the spring, thus compensating for lateral distortion, and at the same time entailing less wear and noise. The upper buffing mechanism is inexpensive from the standpoint of installation and also of maintenance, is peculiarly efficient, and admirably meets all the exigencies of use.

I claim:

1. In a diaphragm buffing mechanism, the combination with the stationary and movable members of the diaphragm, of a bow spring attached in its medial portion to one of the members and at its ends to the other of said members, and links interposed in the connection at the spring ends.

2. In a diaphragm buffing mechanism, the combination with the stationary and movable members of the diaphragm, of a bow spring attached at median point to the movable member and at its ends to the stationary member, and links interposed in the connection of the spring ends to the stationary member.

3. In a diaphragm buffing mechanism, the combination with the stationary and movable members of the diaphragm, of a bow spring attached in its medial portion to one of the members and at its ends to the other of said members, and links interposed in the connection at the spring ends, each of said links comprising an angular shaped plate pivoted at the angle to the member and at the extremity of one leg to the spring end, the other leg lying normally against the member.

4. In a diaphragm buffing mechanism, the combination with the stationary and movable members of the diaphragm, of a bow spring attached at a median point to the movable member and at its ends to the stationary member, and links interposed in the connection of the spring ends to the stationary member, each of said links comprising a pair of spaced angular-shaped plates pivoted at the angle to the member and at the extremity of one leg to the spring end, the other leg lying normally against the stationary member.

5. In a diaphragm buffing mechanism, the combination with the stationary and movable members of the diaphragm, stems extending to the rear of the face plate and slidable within the car framing, and compression springs mounted on said stems and serving as a lower buffing mechanism, of an upper buffing mechanism comprising a bow spring attached in its medial portion to the face plate and at its ends to a stationary support, and links interposed in the connection between the spring ends and the stationary support.

6. In a diaphragm buffing mechanism, the combination with the stationary and movable members of the diaphragm, stems extending to the rear of the face plate and slidable within the car framing, and compression springs mounted on said stems and serving as a lower buffing mechanism, of an upper buffing mechanism comprising a bow spring attached in its medial portion to the face plate and at its ends to a stationary support, and links interposed in the connection between the spring ends and the stationary support, each of said links comprising a pair of spaced angular shaped plates pivoted at the angle to the stationary support and at the extremity of one leg to the spring end, the other leg lying normally against the stationary support.

7. In a diaphragm buffing mechanism, the combination with the stationary and movable members of the diaphragm, of a bow spring attached in its medial portion to one of the members and pivoted at its ends to the other of said members, the end connections allowing for limited play of the spring ends in both directions transversely of the car axis whereby to compensate for lateral distortions under buffing strains.

8. In a diaphragm buffing mechanism, the combination with the stationary and movable members of the diaphragm, of a bow spring attached at a median point to the movable member and hinged at its ends to the stationary member, the end connections allowing for pivotal play transversely of the car axis limited as to extent in both directions inwardly and outwardly whereby to compensate for lateral distortions under buffing strains obliquely applied.

In testimony whereof I have hereunto signed my name in the presence of two subscribing witnesses.

EDWARD E. WHITMORE.

Witnesses:
LEWIS T. GREIST,
MARY C. BROWER.